Oct. 24, 1967  S. L. FLOWERS  3,348,678
AUTOMATIC WEIGHT GRADING APPARATUS
Filed Jan. 10, 1966  4 Sheets-Sheet 1

INVENTOR
STANLEY L. FLOWERS

BY
ATTORNEYS

INVENTOR
STANLEY L. FLOWERS

ATTORNEYS

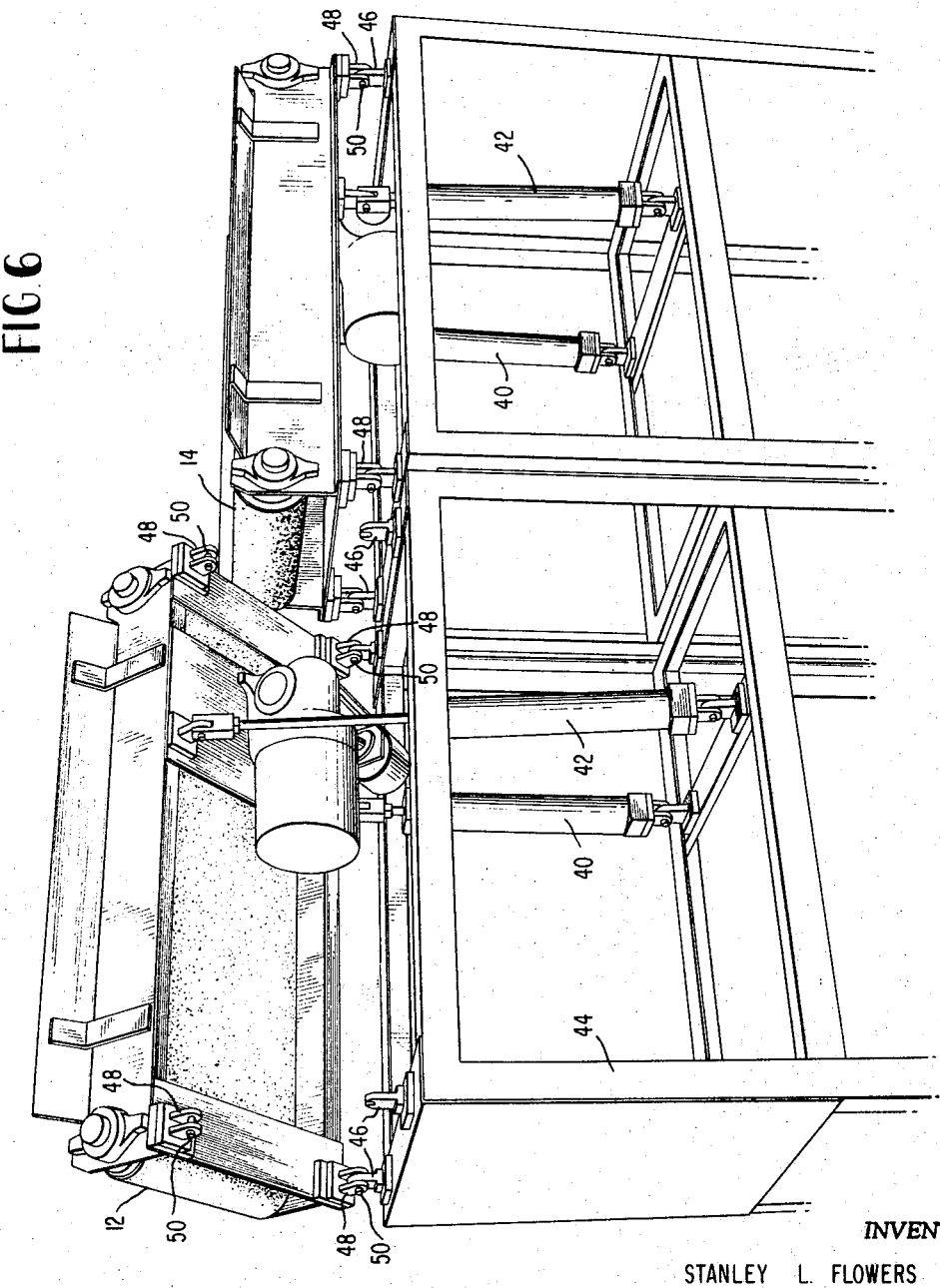

United States Patent Office 3,348,678
Patented Oct. 24, 1967

3,348,678
AUTOMATIC WEIGHT GRADING APPARATUS
Stanley L. Flowers, 103 Bruce Drive,
West Milton, Ohio 45383
Filed Jan. 10, 1966, Ser. No. 519,744
7 Claims. (Cl. 209—74)

ABSTRACT OF THE DISCLOSURE

A weight grading apparatus includes a plurality of aligned conveyor belts, the first of which is mechanically connected to a balance beam scale having a plurality of interconnected balance beams for sensing the weight of an article passed along the first conveyor. The remaining conveyors are selectively tiltable in either of two directions transverse to their movement to discharge articles on either side or pass them straight along automatically depending upon their weight with respect to the setting of the balance beams.

---

The present invention relates to machines for automatically weighing and sorting articles depending upon the range of weight of each article. The invention will be described with reference to the weight grading of hams, but it will be understood that the apparatus has utility in a wide variety of operations other than weight grading of hams or other meats.

It is highly desirable for a meat packer to have at his disposal some means for automatically, quickly, sanitarily and accurately separating hams into different weight grades. For example, if all hams within a two pound weight range can be separated from those within the next higher and next lower two pound weight ranges, then all those in each given weight range may be processed or sold by weight grades according to the needs and desires of the processor. The present invention will be described with reference to an apparatus for effecting a sorting of hams into five distinct weight groups, but it will be readily understood by those skilled in this art that either a lesser or a greater number of groups may be employed.

Accordingly, it is the principal object of the present invention to provide an automatic weight grading apparatus particularly useful for the weight grading of meats and which is effective to separate meats into five distinct weight grades.

A further object of the present invention is to provide a novel, useful and sanitary type separating or classifying conveyor which discharges articles therefrom without the need of any of the conventional diverter devices which ordinarily overlie classifying conveyors.

A still further object of the present invention is to provide a belt conveyor which may be tilted about a pair of axes parallel to the longitudinal axis of the conveyor in order to discharge articles therefrom on either side of the conveyor.

It is also an object of the present invention to provide a novel electrical control circuit interconnecting the weighing means and the discharge means for the conveyors.

Other objects of the present invention will be apparent from a detailed consideration of the following description when read in conjunction with the attached sheets of drawings in which:

FIGURE 6 is a perspective view of the same conveyor showing two sections, one tilted and one level.

In general, the objects of the present invention are achieved by providing, for example, three separately driven belt type conveyors arranged in alignment with each other. The first of these conveyors is carried on a weighing means so that the weight of an article passing therealong is automatically sensed. The other two conveyors are each tiltable about two axes parallel to their path of travel to effect discharge of articles to either side thereof and the tilting mechanism is electrically interconnected with the weighing means so that an article passing along the conveyor system will be discharged from the second and third conveyors into any one of five predetermined locations depending upon the weight range in which the article falls.

Figure 1:
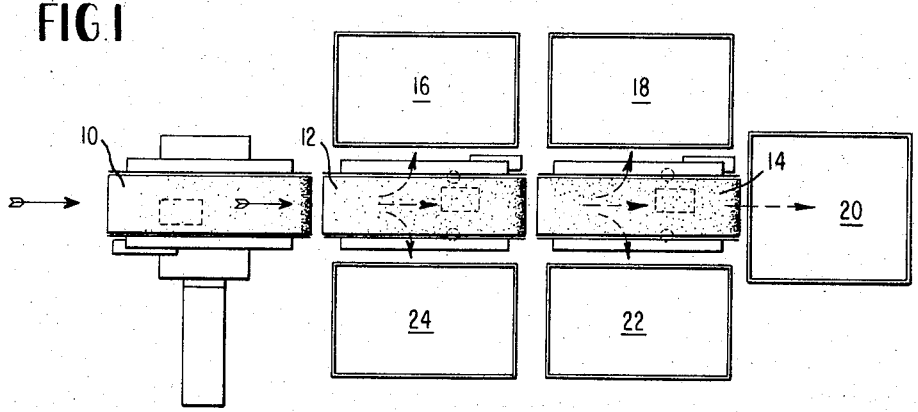
FIGURE 1 is a schematic plan view of the apparatus in accordance with the present invention.

Referring now to the drawings for a detailed description of the present invention, FIGURE 1 is a schematic plan view of the conveyor system in accordance with the present invention. The weighing conveyor is indicated at 10 and the sorting conveyors are indicated at 12 and 14. Each of the conveyors is of the belt type and independently driven. Receptacles 16, 18, 20, 22 and 24 are positioned to receive articles discharged from the conveyors 12 and 14. It is to be understood that the receptacles could be either hoppers or bins or they could also be other conveyors to carry the products of a given weight range to a different location. By means of the weighing apparatus and the control circuit interconnecting the weighing apparatus and the discharge conveyors, all of which will be described in detail hereinafter, a ham, for example, which weighs less than 8 pounds will pass along all three conveyors and will be discharged into the hopper 20. A ham weighing between 8 and 10 pounds will be discharged into hopper 16, between 10 and 12 pounds into hopper 24, between 12 and 14 pounds into hopper 18 and 14 pounds and over will be deposited into hopper number 22.

Figure 3:
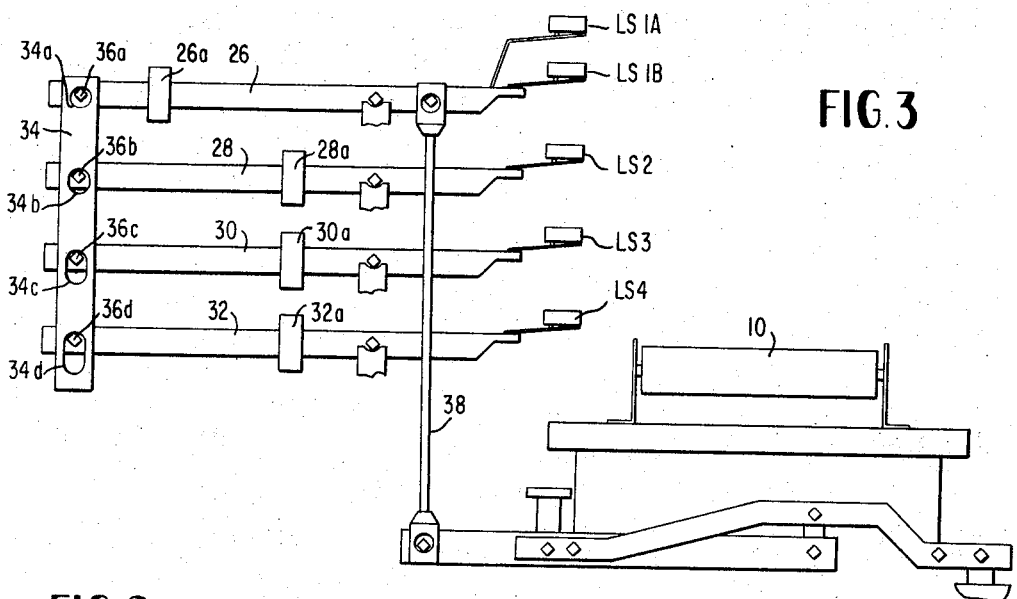
FIGURE 3 is a schematic representation of the weight sensing system of the present invention.

Turning now to FIGURE 3, this is a schematic representation of one type of weight sensing means which is useful in connection with apparatus of the present invention. As shown, the weight sensing means includes four balance beams 26, 28, 30 and 32, having their fulcrums in a common vertical plane and interconnected at their outermost ends by an arm 34 having a series of openings 34a, 34b, 34c and 34d therein. The arm 34 is supported on the uppermost balance beam 26 by means of a projection 36a extending outwardly from the arm 26 and through the opening 34a. Corresponding projections 36b, 36c and 36d extend from arms 28, 30 and 32 through openings 34b, 34c and 34d in the arm 34. It will be noted that proceeding from top to bottom of the arm 34, that the openings increase progressively in size. Each balance beam further carries a sliding poise and these are identified by reference numerals 26a, 28a, 30a and 32a. In order to set the balance beams for the particular sorting arrangement described above with reference to FIGURE 1, the poise on arm 26 which is the uppermost arm would be set at 8 pounds. In other words, if a weight of 8 pounds were placed on the first conveyor, the beam 26 would be in balance with its poise set at the 8 pound mark. The remaining poises beginning with 28a and proceeding downwardly would be set for 2 pounds in each instance.

At the end of the balance beams opposite the ends where they are joined by arm 34, there are positioned a plurality of limit switches for sensing movements of each balance beam about its respective fulcrum. A conventional split steelyard 38 joins the uppermost balance beam 26 with the conventional lever system underlying the weighing pan. The placing of an 8 pound weight on the weighing pan, therefore, is effective to bring the balance beam 26 into balance and this moves the right hand end of the beam away from the switch arm of its associated limit switch. Since the weighing conveyor 10 is connected only to the uppermost balance beam 26 by the steelyard 38, the arm 34 interconnects all the balance beams with a lost motion connection. This is effective to bring each beam to balance as progressively heavier weights are placed on the conveyor 10.

The functioning of the limit switches will be described in detail with reference to the overall schematic wiring diagram of FIGURE 4.

Figure 5:
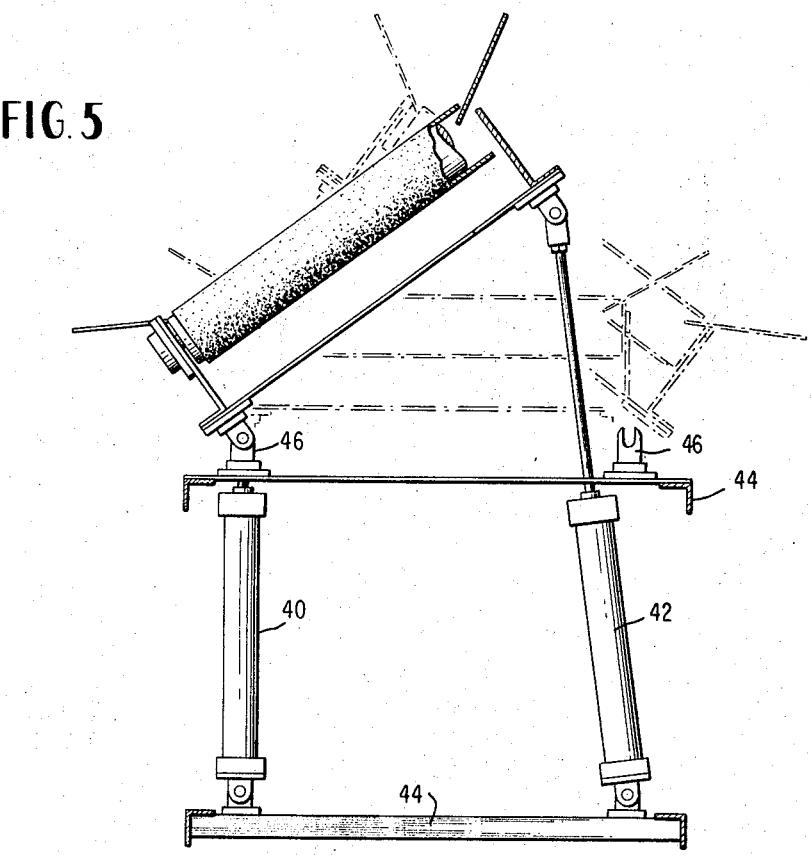
FIGURE 5 is an end elevation of a tiltable belt conveyor in accordance with the present invention.

Referring now to FIGURES 5 and 6, each of the two sorting conveyors 12 and 14 is individually mounted for pivotal movement about a pair of axes which are parallel to the path of travel of the conveyor. In FIGURE 5, one of the conveyors is shown tilted about one of its axes in the full line showing and the dotted line showing indicates the tilt about the other axis. A pair of fluid pressure actuated cylinders 40 and 42 are positioned beneath the sorting conveyor and operatively connected between the conveyor and its supporting base member 44 to effect the desired tilting movement. As shown most clearly in FIGURE 6, the tilting support for the conveyors comprises oppositely disposed pairs of identical trunnion members 46 mounted on the supporting base 44. The other halves of the trunnion members 46 are mounted on the underside of the conveyors as shown at 48. Each of the trunnion members 48 includes at its lowermost end a pin member 50 adapted to engage within the slotted portion of the base mounted trunnion members 46. In this manner, and with the support construction identical on opposite sides of the conveyor, it will be readily apparent that the conveyor as a whole may be tilted about an axis defined by the pair of trunnions positioned on either side of the conveyor structure. FIGURE 6 shows the conveyor 12 tilted in one direction by means of the fluid pressure piston and cylinder arrangement 42 while the conveyor 14 is shown in its level position.

Figure 2:
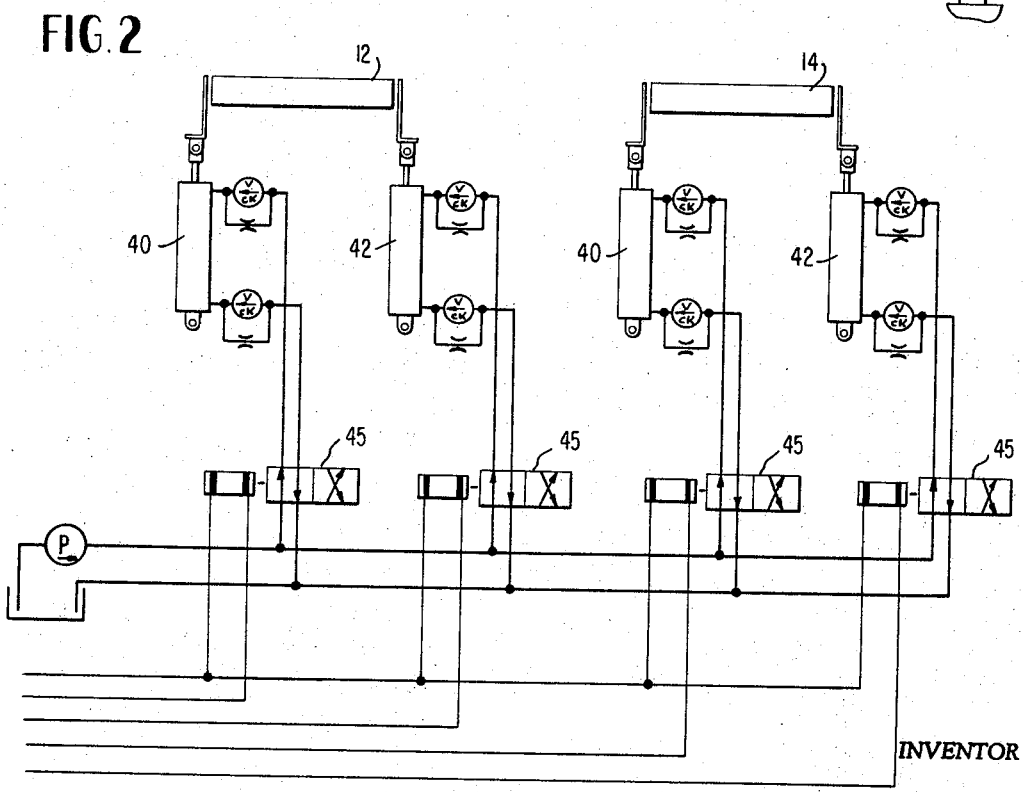
FIGURE 2 is a schematic showing of the air control system for tilting the conveyors.

FIGURE 2 shows in schematic diagram form the fluid pressure circuits for operating the cylinders 40 and 42 to tilt the conveyors 12 and 14. Each of the cylinders 40 and 42 includes fluid pressure inlets to opposite sides of the piston therein and the admission of fluid pressure to the pistons is under the control of solenoid operated valves of identical construction indicated by the reference numeral 45. As indicated in this figure, the normal position of the solenoid valves 45 is such that fluid pressure is always admitted to the upper side of the piston in each cylinder so as to hold the conveyor firmly upon its trunnion on the supporting base. Whenever one of the solenoid valves is actuated, this position is reversed and fluid pressure is then admitted to the underside of the piston to tilt the conveyor about the axis on the opposite side from the actuated cylinder. The other cylinder attached to the same conveyor, however, remains in its normal position which functions to hold that side of the conveyor firmly on its trunnions during the tilting movement of the opposite side of the conveyor.

Figure 4:
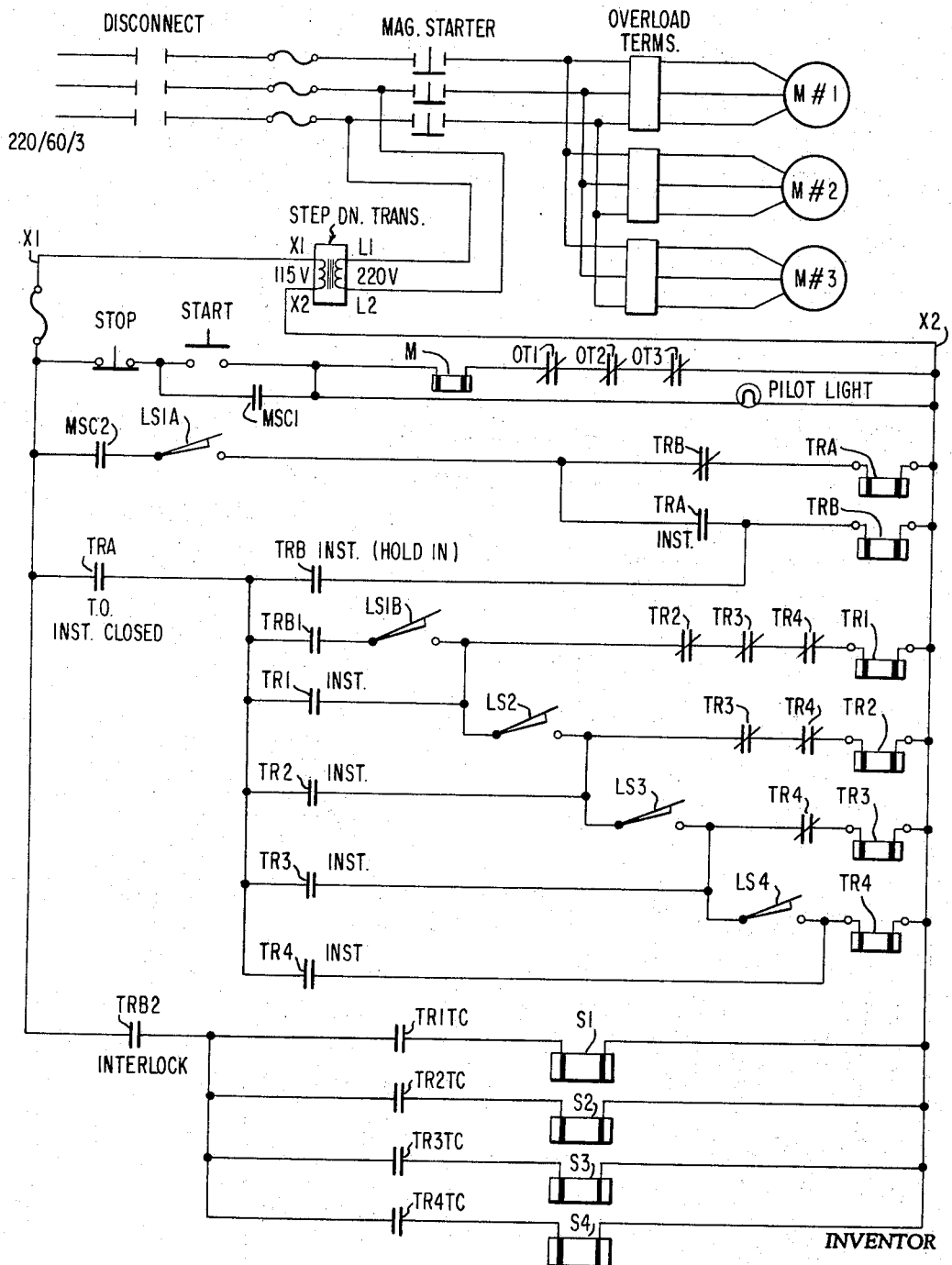
FIGURE 4 is a schematic wiring diagram of the entire control circuit.

Referring now to FIGURE 4, which is a schematic wiring diagram of the overall control circuit, the three motors for driving the three conveyors are shown in the upper right-hand corner of the diagram. These are connected to a three phase supply through conventional fusing, magnetic starting and overload arrangements. One of the three phases is tapped off ahead of the starter for supplying the control circuit through a two-to-one step down transformer. Starting at the top of the single phase control circuit, a conventional stop-start switch is employed in the first leg for energizing the control circuit. It will be noted that closing of the start switch is effective to energize relay M which closes the holding contacts MSC1 and this circuit will, therefore, remain closed until opened by operation of the stop switch or by automatic operation of one of the sets of overload contacts OT1, OT2 and OT3 which are responsive to overload conditions on the three conveyor motors. Energization of relay M also closes another set of contacts MSC2 thus conditioning the remainder of the control circuit for operation which will be entirely dependent upon the weight of articles passing over the weighing conveyor 10. The uppermost balance beam of the weighing means has associated therewith a pair of limit switches LS1A and LS1B and the remaining three balance beams 28, 30 and 32 (FIGURE 3) each has a limit switch associated therewith, namely, LS2, LS3 and LS4, respectively. Each of these switches is of the normally closed type but they are held in their open position by the position of the balance beams 26, 28, 30 and 32, until such time as the balance beams are moved due to the presence of weight on the conveyor 10.

For purposes of discussing the operation of the control circuit, let it be assumed that the poise 26a on the upper balance beam 26 is set for 8 pounds, and that the remaining poises 28a, 30a and 32a on their respective balance beams are each set for 2 pounds. Further assume that a ham weighing between 8 and 10 pounds, i.e., more than 8 but less than 10, is placed on the conveyor 10. Under these circumstances, the balance beam 26 will be brought into balance and the limit switches LS1A and LS1B will close. Referring back to FIGURE 1, it is desired that a ham of this weight range be dropped into the hopper number 16 from conveyor 12 and it is, therefore, necessary that conveyor 12 be tilted to effect this result as the ham is passing thereover. As soon as limit switch LS1A is closed, relay TRA is energized which immediately closes normally open contacts TRATO. This is a time relay and the contacts TRATO while instantaneously closed by the energization of TRA will automatically open after a predetermined passage of time. Since they close immediately with the energization of TRA, however, and since contact TRA–INST also closes at the same time relay TRB is energized which closes contact TRB–INST and establishes a holding circuit for relay TRB. The closing of limit switch LS1B then complete a circuit through relay TR1 which closes contacts TR1TC to energize solenoid S1 of the first reversing valve which is effective to tilt conveyor 12 in a direction to deposit the ham hereon in hopper 16. It should be noted that if the ham were of the next higher weight range, that is, more than 10 but less than 12 pounds, that balance beam 28 would have been brought into balance closing limit switch LS2 to energize relay TR2. It will be noted that relay TR2 has a set of normally closed contacts TR2–2 in series with relay TR1 to prevent energization of relay TR1 under these circumstances. This insures that for articles falling within the second weight range, i.e., more than 10 but less than 12 pounds, which is sufficient to close limit switch LS2, that it is relay TR2 and solenoid S2 that are energized and not any of the other relays such as TR1, TR3 or TR4.

The timing out of relay TRA is, of course, timed to the speed of travel of the conveyors 10, 12 and 14 so as to return the control circuit to its normal condition as soon as a given sorting operation has taken place.

The timing relay TRA is an off delay timer and is necessary to hold the circuit closed through TRB even though the limit switches LS1A and LS1B are fluttering due to the upper balance beam 26 returning to its normal position when the weight passes off of conveyor 10. Likewise, the TRB relay is an on delay timer which is necessary to hold the circuits open while all of the limit switches are fluttering or until the correct weighing circuit has been closed.

The basic design of the present system takes into consideration the problems of sanitation found in the food industry and is more readily adaptable to sanitation requirements.

The basically simple electro-mechanical control system used in this system requires only the services of a good maintenance man or scale service man to keep the system operational. These people are much more available and inexpensive than the highly trained technicians required in the maintenance of electronic or pneumatic systems.

The use of weighbeams in the sensing part of the system and the simplicity of the method of tilting the conveyors to achieve separation of articles provides for much more economy of construction when compared to any other known method of doing the same job. This means that the consumer has the advantage of a much better purchase price with the present system. These same features also provide for lower maintenance costs in the plants where conditions of high humidity exist.

From the foregoing, it is believed that those skilled in the art will readily understand that there is herein shown and disclosed a new and useful weight grading apparatus which has primary utility in the field of weight grading of hams but which will have general utility wherever an automatic weight grading apparatus is required. While a preferred embodiment of the present invention has been herein disclosed, applicant claims the benefit of a full range of equivalents within the scope of the appended claims.

I claim:

1. An automatic weight grading apparatus comprising:
   a base;
   at least two belt conveyors on said base arranged in alignment and adjacent one another;
   weighing means connected to the first of said conveyors for sensing the weight of an article as it passes along said conveyor;
   trunnion means positioned on opposite sides of said base and supporting the other of said conveyors thereon for pivotal movement on axes parallel to the longitudinal axis of the other of said conveyors;
   article discharge means for selectively tilting the other of said conveyors on said trunnions in opposite directions each transverse to the movement of said conveyor;
   and means interconnecting said weighing means and said tilting means whereby the other of said conveyors remains in untilted condition for articles below a first predetermined weight, is tilted in one direction for articles greater than said first but less than a second predetermined weight and is tilted in the opposite direction for articles greater than said second predetermined weight.

2. Apparatus as defined by claim 1 in which there are three contiguously aligned belt conveyors and including means for selectively tilting the third of said conveyors in opposite directions each transverse to the movement of said conveyor and in which said weighing means are also connected to the tilting means of said third conveyor for tilting said third conveyor in one direction for articles greater than a third predetermined weight but less than a fourth predetermined weight and for tilting said third conveyor in the opposite direction for articles greater than said fourth predetermined weight.

3. For use in a sorting system, a positively driven belt conveyor assembly comprising in combination:
   a belt conveyor;
   a base;
   trunnion means positioned on opposite sides of said base and supporting said conveyor thereon for pivotal movement on axes parallel to the longitudinal axis of said conveyor;
   and means for selectively tilting said conveyor on said trunnions in two directions each transverse to the longitudinal axis of said conveyor.

4. A conveyor assembly as defined by claim 3 in which said last mentioned means comprises a pair of air cylinders each having pistons therein interconnecting said base and said conveyor on opposite sides thereof.

5. For use in a weight grading system, a positively driven belt conveyor assembly comprising:
   a belt conveyor;
   a base;
   trunnion means positioned on opposite sides of said base and supporting said conveyor thereon for pivotal tilting movement on either of two axes parallel to the longitudinal axis of said conveyor;
   a pair of cylinders each having pistons therein interconnecting said conveyor and said base on opposite sides thereof;
   and means for supplying fluid pressure to one side of each of said pistons simultaneously for holding said conveyor firmly on said base and for selectively supplying fluid pressure to opposite sides of either of said pistons for tilting said conveyor on either of the axes parallel to the longitudinal axis of said conveyor.

6. An automatic weight grading apparatus comprising in combination:
   at least two belt conveyors arranged in alignment adjacent one another;
   article discharge means for selectively tilting the second of said conveyors in opposite directions each transverse to the movement of said conveyor;
   weighing means including at least two balance beams arranged in substantially vertical alignment, interconnected by a lost motion connection adjacent one end and the uppermost of said beams being mechanically linked at its opposite end to said first conveyor, in order that said uppermost balance beam is brought into balance when an article corresponding in weight to the setting of said beam is passed along said first conveyor and said second balance beam is brought to balance when an article corresponding in weight to the combined weight setting of said balance beams is passed along said first conveyor;
   and means interconnecting said weighing means and said article discharge means whereby said second conveyor remains in untilted condition or tilts in one or the other direction when an article passes therealong, the weight of which was determined on said first conveyor to have been less than the weight setting of said uppermost balance beam, equal to said setting, or equal to or greater than the combined weight settings of said balance beams.

7. The combination defined by claim 6 in which there are three belt conveyors and four balance beams enabling weight grading into five different grades.

References Cited

UNITED STATES PATENTS 2,949,999   8/1960   Sundin _____ 198—185
3,275,135   9/1966   Niese _____ 209—121

M. HENSON WOOD, JR., *Primary Examiner.*

R. A. SCHACHER, *Assistant Examiner.*